(12) United States Patent
Reeves et al.

(10) Patent No.: US 9,747,303 B1
(45) Date of Patent: *Aug. 29, 2017

(54) FILE LOCATION APPLICATION PROGRAMMING INTERFACE

(71) Applicant: Sprint Communications Company L.P., Overland Park, KS (US)

(72) Inventors: Raymond Emilio Reeves, Oviedo, FL (US); Ryan Alan Wick, Apollo Beach, FL (US); John Marvin Jones, III, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/010,959

(22) Filed: Jan. 29, 2016

Related U.S. Application Data (63) Continuation of application No. 14/262,376, filed on Apr. 25, 2014, now Pat. No. 9,292,540, which is a continuation of application No. 12/170,381, filed on Jul. 9, 2008, now Pat. No. 8,762,429.

(51) Int. Cl.
*G06F 17/30* (2006.01)

(52) U.S. Cl.
CPC .. *G06F 17/30233* (2013.01); *G06F 17/30557* (2013.01)

(58) Field of Classification Search
CPC ......... G06F 17/30233; G06F 17/30235; G06F 17/30238; G06F 17/30557; G06F 17/30566
USPC .............. 707/705, 758, 770, 805, 812, 831, 707/999.205, E17.01; 717/168; 709/238, 709/239, 242
See application file for complete search history.

(56) References Cited

U.S. PATENT DOCUMENTS

| | | | |
|---|---|---|---|
| 6,968,350 B2 | 11/2005 | Traut et al. | |
| 7,406,039 B2 | 7/2008 | Cherian et al. | |
| 7,693,835 B2 | 4/2010 | Ohta et al. | |
| 8,762,429 B1 * | 6/2014 | Reeves ............. | G06F 17/30238 707/812 |
| 2002/0078255 A1 | 6/2002 | Narayan | |

(Continued)

OTHER PUBLICATIONS

Notice of Allowance dated Feb. 3, 2014 in U.S. Appl. No. 12/170,381, 9 pages.

(Continued)

*Primary Examiner* — Greta Robinson (57) ABSTRACT

Media, methods and systems are provided for interfacing a mobile device to an application virtual machine via an application programming interface (API). A first set of file connection properties for one or more internal storage locations and a second set of file connection properties for one or more external storage locations are defined at a mobile device. The first and second sets of file connection properties define the file storage locations for a plurality of media types. Requests are received from the application virtual machine for the first and second sets of file connection properties. The application virtual machine identifies a current default storage area that can be selected from the one or more internal storage locations and the one or more external storage locations, and indicates whether the current default storage location is an internal storage location or an external storage location.

20 Claims, 6 Drawing Sheets

(56) References Cited

U.S. PATENT DOCUMENTS

| | | |
|---|---|---|
| 2004/0046787 A1 | 3/2004 | Henry et al. |
| 2004/0078467 A1 | 4/2004 | Grosner et al. |
| 2006/0005189 A1 | 1/2006 | Vega et al. |
| 2006/0036941 A1 | 2/2006 | Neil |
| 2006/0123397 A1 | 6/2006 | McGuire |
| 2007/0180450 A1 | 8/2007 | Croft et al. |
| 2007/0198656 A1 | 8/2007 | Mazzaferri et al. |
| 2007/0207819 A1 | 9/2007 | Redpath |
| 2007/0234302 A1 | 10/2007 | Suzuki et al. |
| 2007/0234337 A1* | 10/2007 | Suzuki ............... G06F 8/61 717/168 |
| 2007/0244877 A1 | 10/2007 | Kempka |
| 2007/0244926 A1* | 10/2007 | Vitanov ............ G06F 9/4443 |
| 2008/0147678 A1 | 6/2008 | Peters et al. |
| 2008/0274716 A1 | 11/2008 | Fok et al. |
| 2009/0025011 A1 | 1/2009 | Neil et al. |
| 2009/0204963 A1 | 8/2009 | Swart et al. |
| 2009/0271787 A1 | 10/2009 | Clark |
| 2010/0217747 A1 | 8/2010 | Vitanov et al. |

OTHER PUBLICATIONS

Non Final Office Action dated Sep. 4, 2013 in U.S. Appl. No. 12/170,381, 13 pages.
Non Final Office Action dated Apr. 23, 2013 in U.S. Appl. No. 12/170,381, 13 pages.
Non Final Office Action dated Dec. 27, 2012 in U.S. Appl. No. 12/170,381, 9 pages.
Advisory Action dated Nov. 23, 2011 in U.S. Appl. No. 12/170,381, 3 pages.
Final Office Action dated Sep. 15, 2011 in U.S. Appl. No. 12/170,381, 10 pages.
Non Final Office Action dated Apr. 7, 2011 in U.S. Appl. No. 12/170,381, 9 pages.
First Action Interview Preinterview Communication dated Jun. 30, 2015 in U.S. Appl. No. 14/262,376, 5 pages.
First Action Interview Office Action dated Aug. 26, 2015 in U.S. Appl. No. 14/262,376, 8 pages.
Notice of Allowance dated Nov. 12, 2015 in U.S. Appl. No. 14/262,376, 8 pages.

\* cited by examiner

FILE LOCATION APPLICATION PROGRAMMING INTERFACE

PRIORITY

This application is a continuation of U.S. patent application Ser. No. 14/262,376, filed 25 Apr. 2014, which was a continuation of U.S. patent application Ser. No. 12/170,381, entitled "FILE LOCATION APPLICATION PROGRAMMING INTERFACE," filed 9 Jul. 2008 and issued as a United States patent on 24 Jun. 2014, U.S. Pat. No. 8,762,429, which are hereby incorporated by reference in their entirety.

BACKGROUND

Many mobile devices today, such as cellular phones and personal data assistants (PDAs) use the Java™ 2 Platform Micro Edition (J2ME) framework as an underlying platform. This framework is prevalent for use with devices that are unable to take full advantage of other platforms such as Java™ Standard Edition, because of resource limitations, like reduced memory capacity, interface limitations, etc. However, even with such constraints, each edition of the framework must meet standards that are regularized in response to a Java™ Specification Request (JSR). Through the Java™ Community Process (JCP), updated versions, optional packages, and newly found needs can be codified. Basic and optional specifications allow users foundational device capabilities, as well as the ability take advantage of web services. Such APIs enable web functions such as secure and trustworthy connections, and wireless online payments. Another burgeoning area of optional packages is apparent in the combination of cellular phones and PDAs with previously separate devices, such as cameras, music players, and global positioning system (GPS) devices. Mobile media, device location, three-dimensional (3D) graphics, and advanced multimedia functions are just a handful of the illustrative specifications. However, the focus in some specifications on resource-limited devices results in providing standardization of the internal memory locations only. Thus, as components and ports advance, such as input/output (I/O) components and I/O ports, so too does the complexity of managing interactions. To illustrate the case, the rise of cellular phones with picture-taking capabilities was quickly developed and has been equally as rapidly adopted by users. However, the first camera-phone combinations were simply capable of capturing a limited number of very low resolution images. As the quality of the images improved, so did the desire to store or print these pictures. The resulting need is the ability to save in another location, for instance on a removable medium, on a more sophisticated computer, or at a web-accessible location. This requires extending the capabilities compliant devices by adding file-accessing options that take into account more sophisticated mobile devices.

SUMMARY

Embodiments of the invention are defined by the claims below. A high-level overview of embodiments of the invention is provided.

In a first embodiment, computer-readable media provide for flexibly accessing file structures for operations between an application virtual machine and a mobile device. At the application virtual machine, the media include instructions for requesting a first set and a second set of file connection properties on a mobile device. The first set includes internal location properties on the mobile device that are configured to return to the virtual machine values for one or more requested locations of internal storage on the mobile device. The second set includes location properties on the mobile device that are configured to return to the virtual machine values for one or more requested locations of external storage in communication with the mobile device. A storage location is identified as selected from storage locations included in the first and second sets of file connection properties. Whether the identified storage location is an internal storage location or an external storage location is indicated to the virtual machine.

In a second embodiment, a method provides system properties for filepath identification from a mobile device to an application virtual machine via an application programming interface (API). The method includes defining, at the mobile device, a first set of file connection properties for one or more internal storage locations and a second set of file connection properties for one or more external storage locations. The first and second sets of file connection properties define the file storage locations for a plurality of media types. A request is received from the application virtual machine for the first and second sets of file connection properties. The application virtual machine identifies a current default storage area that can be selected from the one or more internal storage locations and the one or more external storage locations, and indicates whether the current default storage location is an internal storage location or an external storage location.

In a third embodiment, a system is provided for interfacing application virtual machines in a consistent manner with a mobile device. The system includes a mobile device, an application programming interface (API), and at least one application virtual machine. The mobile device includes one or more data structures containing file connection properties for a plurality of internal storage locations and a plurality of external storage locations. The API communicates file connection requests between the mobile device and the application virtual machine utilizing the file connection properties. The one or more application virtual machines include one or more components utilized to communicate requests and responses regarding the file connection properties to the mobile device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the invention provide methods, media, and systems for interfacing application virtual machines (VMs) with mobile devices. More particularly, embodiments allow users and developers to access memory locations that were not previously available through default settings chosen by the individual mobile device manufacturer. Improving the application programming interface (API) that provides file connection properties to the application VMs allows file storage options beyond the system's default folder. Another improvement under this approach stems from identifying the default option as an internal or external location, so that a user or developer is aware of what file directory they are or will be accessing. In this way, the user is more aware of the memory location in which he or she is storing a file, or from which he or she is accessing a file. Additionally, developers are given leeway to more flexibly implement code with allowed file-type folders in mind. By encouraging use of synonymous file structures, that is to say folders that are not device-specific but are routed to a device's default internal location through a common naming convention, such code development is more consistent across device and application manufacturers.

Throughout the description of the present invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

API Application Programmatic Interface
CD-ROM Compact Disc-Read Only Memory
CLDC Connected Limited Device Configuration
DVD Digital Versatile Discs
EEPROM Electronically Erasable Programmable Read Only Memory
FCOP File Connection Optional Package
GPS Global Positioning System
GUI Graphical User Interface
J2ME Java™ 2 Platform, Micro Edition
JCP Java™ Community Process
JSR Java™ Specification Request
MIDP Mobile Information Device Profile
OS Operating System
PDA Personal Data Assistant
PIM Personal Information Management
RAM Random Access Memory
ROM Read Only Memory
SD Secure Digital
URL Universal Resource Locator
VM Virtual Machine Further, various technical terms are used throughout this description. An illustrative resource that fleshes out various aspects of these terms can be found in Newton's Telecom Dictionary by H. Newton, 24th Edition (2008).

Embodiments of the invention include, among other things: a method, system, or computer-program product. Accordingly, the embodiments may take the form of a hardware embodiment, a software embodiment, or an embodiment combining software and hardware. In one embodiment, the invention takes the form of a computer-program product that includes computer-useable instructions embodied on one or more computer-readable media.

Computer-readable media include both volatile and non-volatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The figures, in general, will use similar numbering conventions from figure to figure, where practical, to show like or substantially similar features. With regard initially to FIG. 1, an exemplary operating environment for implementing embodiments of the invention is shown and designated generally as mobile device operating environment, alternatively referred to as mobile device 100. Mobile device 100 is but one example of a suitable mobile environment and is not intended to suggest any limitation as to the scope of use or functionality of the invention. Neither should mobile device 100 be interpreted as having any dependency or requirement relating to any one or combination of modules or components illustrated.

Embodiments may be described in the general context of computer code or machine-useable instructions, including computer-executable instructions such as program modules, being executed by a cellular phone, a personal data assistant or other handheld mobile device. Generally, program modules including routines, programs, objects, modules, data structures, and the like, refer to code that performs particular tasks, or implement particular data types. Embodiments may be practiced in a variety of system configurations, including hand-held devices, consumer electronics, specialty computing devices, etc.

Figure 1:
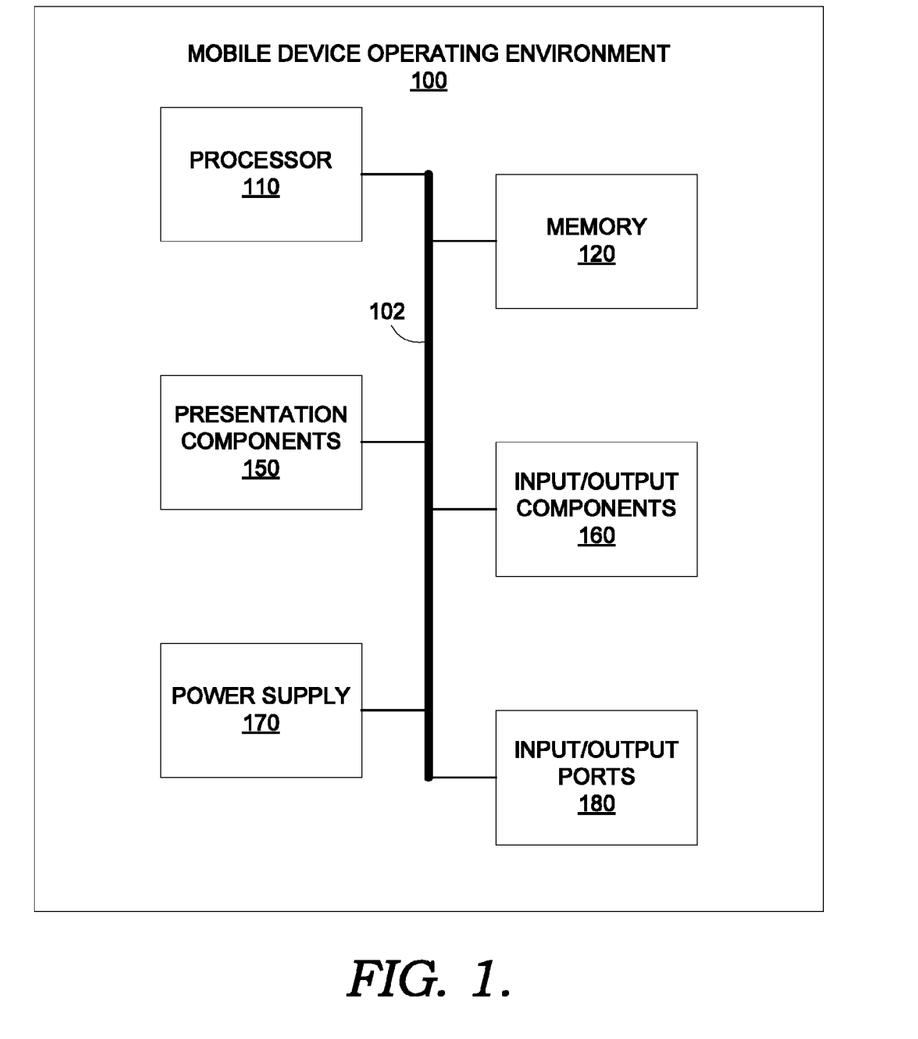
FIG. 1 depicts an exemplary operating environment of a mobile device in accordance with embodiments of the invention.

With continued reference to FIG. 1, mobile device 100 includes a bus 102 that directly or indirectly couples the following components: one or more processors 110, memory 120, one or more presentation components 150, input/output (I/O) components 160, I/O ports 180, and an illustrative power supply 170. Bus 102 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider presentation components 150, such as a display screen, to be an I/O component. Also, processors have memory. The inventors hereof recognize that such is the nature of the art, and reiterate that the diagram of FIG. 1 is merely illustrative of an exemplary mobile device 100 that can be used in connection with one or more embodiments. Distinction is not made between such categories as "web-enabled cellular phone," "personal data assistant," etc., as all are contemplated within the scope of FIG. 1 and reference to "mobile device."

Mobile device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by mobile device 100.

Mobile device 100 includes one or more processors 110 that read data from various entities such as memory 120 or I/O components 160. Memory 120 includes computer-storage media in the form of volatile and/or nonvolatile memory. Memory 120 may be removable, non-removable, or a combination thereof. Exemplary devices for memory 120 include solid-state memory, hard drives, optical-disc drives, etc. Presentation components 150 present data indications to a user or other device. Exemplary presentation components 150 include a display screen, speaker, vibrating module, etc. I/O ports 180 allow mobile device 100 to be logically coupled to other devices including I/O components 160, some of which may be built in. Illustrative components include a keyboard, microphone, cursor or focus-movement buttons, satellite devices, touch pad or touch screen, scanner, etc.

The mobile devices understood to be compatible with mobile device 100 above can use the Java™ 2 Platform Micro Edition (J2ME) framework as an underlying platform. As discussed above, a Java Specification Requests (JSR) is part of the standardization process for this platform. One basic specification is JSR-30, which was developed as a first minimum library set needed to enable the use of virtual machines (VMs). This specification implements what is also known as version 1.0 of the Connected Limited Device Configuration (CLDC). The specification, and its update (JSR-139 for CLDC 1.1), are concerned with the most resource-constrained devices, such as low-memory cell phones and pagers. Another such foundational specification is that describing the Mobile Information Device Profile (MIDP), which provides a graphical user interface (GUI) API as part of JSR-37. This aspect of the overall platform has also been updated in the form of JSR-118, which is directed to MIDP 2.0. Mobile device 100 is able to utilize these standards, or specifications that are compatible with these specifications.

Figure 2:
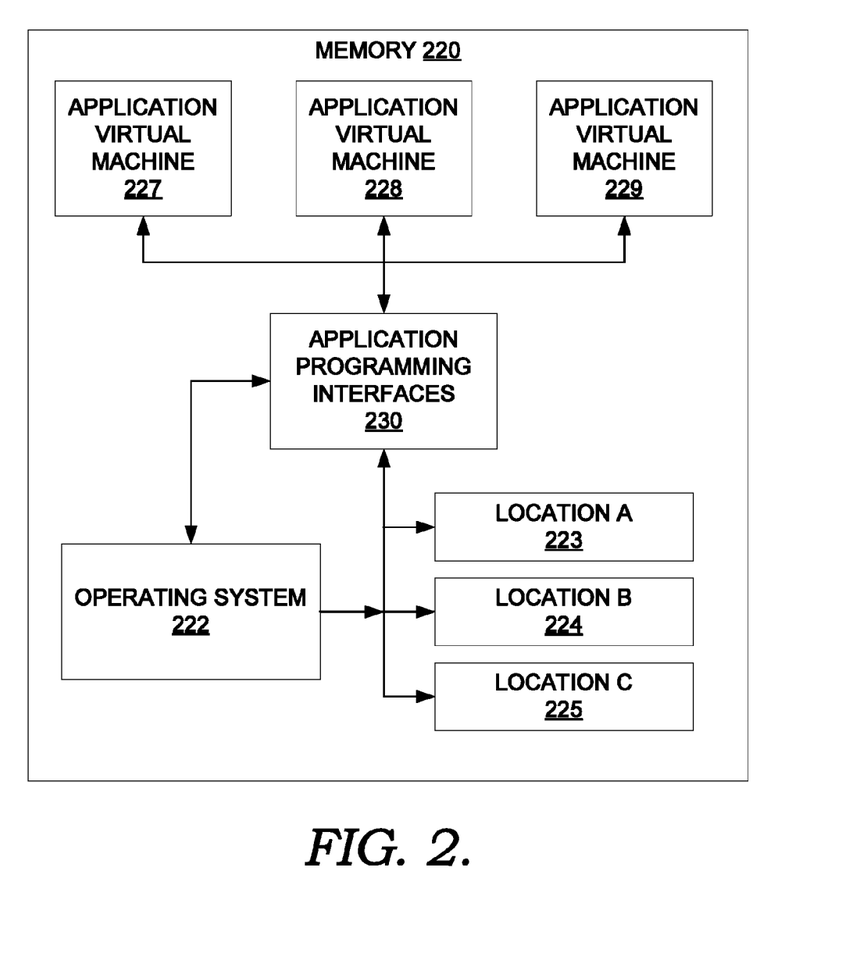
FIG. 2 is a simplified block diagram representing component interaction in accordance with embodiments of the invention.

A block diagram representing interaction of certain components of mobile device 100 according to embodiments of the invention is depicted in greatly simplified form and will be described below. More specifically, this diagram represents the interaction of a mobile device's operating system with application virtual machines within memory components of the device. Between these two components are application programming interfaces that enable various component functions, provide access for other memory locations, and generally enable applications to be used on the device.

Turning now to FIG. 2, memory 220 is not intended to contain only the data structures and modules shown, but is simplified for the ease of illustration. Processor 110 and busses 102 will be integrally involved in the reading and writing of data stored within memory 220. Again, for the sake of clarity, an operating system 222 is shown as a discrete component or module in communication with three memory locations 223, 224, and 225, and application programming interfaces 230. Memory locations 223, 224, and 225 are not meant to limit the present embodiments to memory having only three addressable locations outside of the other modules and components. This is illustrative in nature. Memory 220 may have thousands or millions of storage locations, depending on the resources of the device.

Continuing with FIG. 2, three application virtual machines (VMs) are shown numbered as a VM 227, a VM 228, and a VM 229. These can be Java™ application virtual machines that carry out any type of tasks manipulating files of different media types. For mobile devices that use the J2ME platform, these applications are known as MIDlets. Looking at the exemplary applications in FIG. 2, VM 227 may be a utility MIDlet that allows a user to upload photos for use as the GUI "wallpaper" image. As another example, VM 228 could be a utility application for the download of ringtones and other audio clips. As a final illustration, VM 229 could be a video game designed for the J2ME platform. These are exemplary applications that are common to the devices described above and below, and should not be construed as limiting the scope of the present invention. Instead, all applications consistent with the J2ME platform are contemplated within the scope of the described embodiments.

In FIG. 2, the application VMs are in communication with a set of application programming interfaces (APIs) 230 so that the applications may properly interact with operating system 222 and memory storage locations 223-25. APIs 230 will include some or all of the JSR-compliant APIs described above, including foundational specifications, such as JSRs 30 or 139 for VM-enablement and 38 or 117 for GUI and assorted other functions. Other specifications that may be necessary for the operation of mobile device 100 have been omitted for the sake of clarity and many specific optional packages will not be described. However, APIs 230 will include at least one package that improves upon an optional API found in JSR-75. The optional interface, known as the File Connection Optional Package (FCOP), specifies the requirements for two aspects on devices that have become commonplace in the mobile environment. The first is file connection, that is the ability to provide access to file structures on the mobile device. Mobile devices, although constrained compared to more sophisticated devices like desktop and laptop computers, increasingly have available memory for various functions. Also described in JSR-75 are capabilities for Personal Information Management (PIM), which provides the access to typical device data, such as address books, calendars, lists, etc. Again, while not as complex as some computers, mobile devices have become increasingly relied upon to store vital information. The combination of these two features allows a device to read and write to storage locations on the device, such as to memory locations 223-25. The FCOP does not perform the necessary functions to enhance external memory options and to seamlessly integrate these options so that users can take advantage of them to their fullest extent. The JSR-75 focus on resource-limited devices results in providing standardization of the internal memory locations only. This requires extending the capabilities of JSR-75-compliant devices by adding file-accessing options that take into account the more sophisticated mobile devices now available.

Extending file connection capabilities may be achieved by providing standardized implementations in the APIs. Thus, a file connection API that allows for universal exposure of the file structures in use would improve the current J2ME specification. Some embodiments of the invention accomplish this by providing public string properties, enumerated explicitly for the applicable internal or external locations. In doing this, each application VM is then able to access the correct directory or file location in order to further extend the device's functionality. These enumerated locations could be divided in a number of ways. Because different components of the device will only be involved with specific types of files, photo files for use with the picture-taking components for instance, one manner in division can be by file type. Therefore, both internal and external file connection locations can be listed as those appropriate for photos, videos, audio files, messages, etc. These divisions are arbitrary and could be further divided if appropriate. For example, audio information may be divided further into music, ringtones, and recordings—each appropriate for only some of the applications that use audio files.

Of course, there are other methods of dividing the directories that are needed by an application into locations that must be exposed for efficient file connection. Another example is seen by applications that seek file connections relative to those previously utilized. When on a sophisticated computing device, applications will try to access files for opening, saving, and closing according to a specified scheme. Thus, a word-processing application may always attempt to open files from a directory contained in the application's folder space. Alternatively, the application may be instructed to access files from the last folder to which information was saved, or the last folder from which information was read. If there is not information available to direct the application to one of these folders, then a default location may be utilized as a back-up option. With the increasing need to access and store files on mobile devices, such a scheme would also be beneficial to the use and enjoyment of the device. Thus, any time a camera-phone has written an image file to an external location, it may be desirable to access the same directory for the next image-writing operation.

Three exemplary sets of file connection properties will now be described as may be utilized with embodiments of the invention. The file connection properties are stored on the mobile device and accessed by the improved application programming interface to extend the capabilities of previously described application virtual machines. Requests by a VM result in the API examining a property that may be stored in the form of a string value. The string values give storage locations to which the application should attempt to connect for file access. These properties can be based upon recent application operations, internal locations, or external locations.

Figure 3:
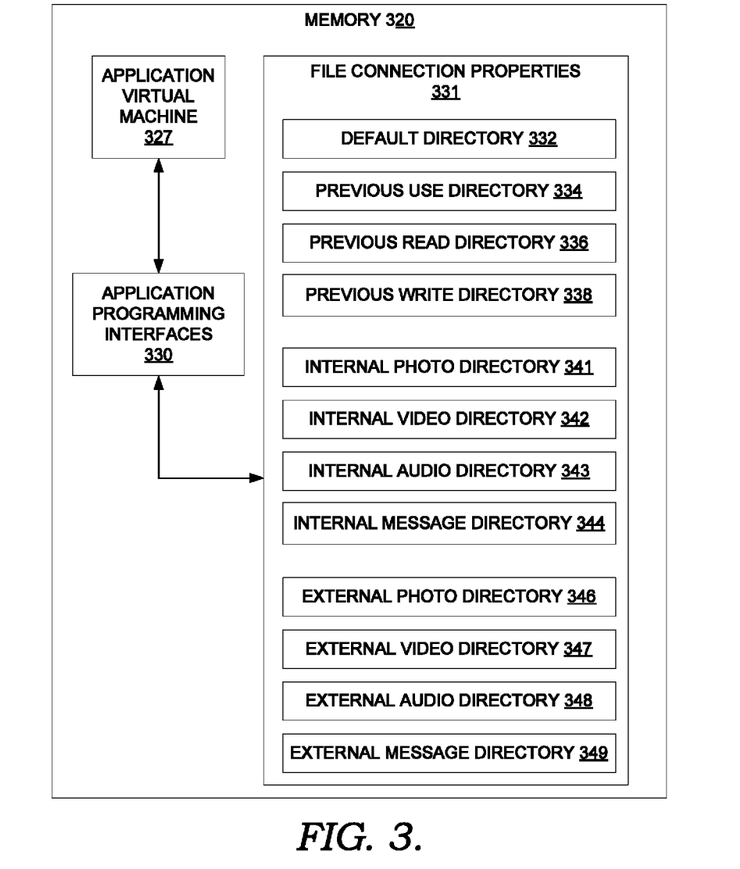
FIG. 3 shows two exemplary sets of file connection properties in simplified block diagram format.

Now describing FIG. 3, The components depicted are shown in a memory 320. Memory 320 includes application programming interfaces 330, and an application virtual machine 327. Also included is a superset of file connection properties 331 that represent all of the file connection properties available to all applications of the device. The size of file connection properties 331 is not meant to convey a proportional allocation of memory space. File connection properties 331 can be seen to have three groups that each make up a subset of properties 331. The first group represents a default directory 332, a previous-use directory 334, a previous-read directory 336, and a previous-write directory 338. At these locations, variables are defined that return the filepath used incident to some previous file-accessing operation, such as the last time an application had to read from a directory as in the case of previous-read directory 336. An example of this may be a specified file path to a particular directory structure on the mobile device. Alternatively, it may be a specified path to a file folder on a removable medium, such as a secure digital (SD) card. SD cards are non-volatile memory cards developed for use in a variety of portable devices. Returning to the set of file connection properties described above, write operations, unspecified file access of any type, and a default filepath all are included as potential properties that are exposed to the requesting application VM.

The second and third sub-sets of file connection properties are divided into two categories and mirror one another—internal media file-type directories and external media file-type directories. The internal set represents a photo directory 341, video directory 342, audio directory 343, and a message directory 344. As previously mentioned, these file connection properties can be useful for applications that only manipulate a single type of file. For example, an image-capturing component, i.e., a camera, may be able to ignore directories used for video, audio, and messaging. Thus, the VM for this application may only need to discover the file connection properties for photo directory 341. This can be as simple as a request to retrieve the property value, which may be stored as a string value, e.g., "fileconn.dir.internal.photos" for the internal file connection properties. This request by the application results in the API returning a publicly accessible string value as mentioned previously, such as "//internal/photos/" as one example. For particularly ubiquitous directories, like an internal photos or images folder may be considered for a camera-equipped phone, a synonymous directory may be provided. This type of directory is simply a naming convention that adds an additional translation step to the connection discovery process. An example of this would be the naming convention in many camera-equipped cellular phones that utilizes "//manufacturername/photos/" rather than the internal/external designation. Here, the previously used example of "//internal/photos/" would be automatically redirected to file connection properties with the device manufacturer's name inserted. Standardization would not require the device producers to discontinue using their company names as part of the filepath, simply an added layer of processing by the application would be necessary.

Continuing with FIG. 3, the external file connection properties group has a similar set depicted at directories 346-349, respectively. The same types of files can be used, but as mentioned above, these could be further subdivided. As an example, videos directory 347 could be further delineated by device-recorded videos for mobile devices with such capabilities, and loaded content such as television, movies, etc. Audio directory 348 could also be sub-divided by music, ringtones, recordings, and the like. The possibilities of external properties are in some ways more easily defined, and in other ways more limitless. As one example, SD cards may be one removable means used to store data. However, regardless of the particular card in use, the filepath will reflect the directories location at the removable card reader. Thus, a request for the properties of "fileconn.dir.external.photos" may simple return "//SD_card/photos" to denote the I/O port that connects to the card slot. As a more varied example, it is possible to read and write to web-accessible locations. This can allow a user to upload or download multi-media files from any internet page available to the mobile device. Take the instance of so-called "social networking" web sites that offer profile pages, along with the upload and download of photos, music, files, etc. While the actual directory structure itself is dependent only on the standard conventions associated with internet accessibility, the convention available for reading or writing from such a site may be quite simple. The request for an external photos file connection property may return a value that is tagged as a universal resource locator (URL), followed by the address to which or from which files are accessed at the social-networking site.

The remaining discussion will focus on methods of interaction and processes of interfacing components according to embodiments of the invention. A first method involves the request of file connection properties by an application and the reception of those properties via the improved API. Current operations have properties identified by the API, which also indicates whether the properties are internal or external. A second and third method are performed by an improved API to determine what connection properties are known and returning those values. In the event that connection properties cannot be determined, default settings are passed from the mobile device to the application virtual machine.

Figure 4:
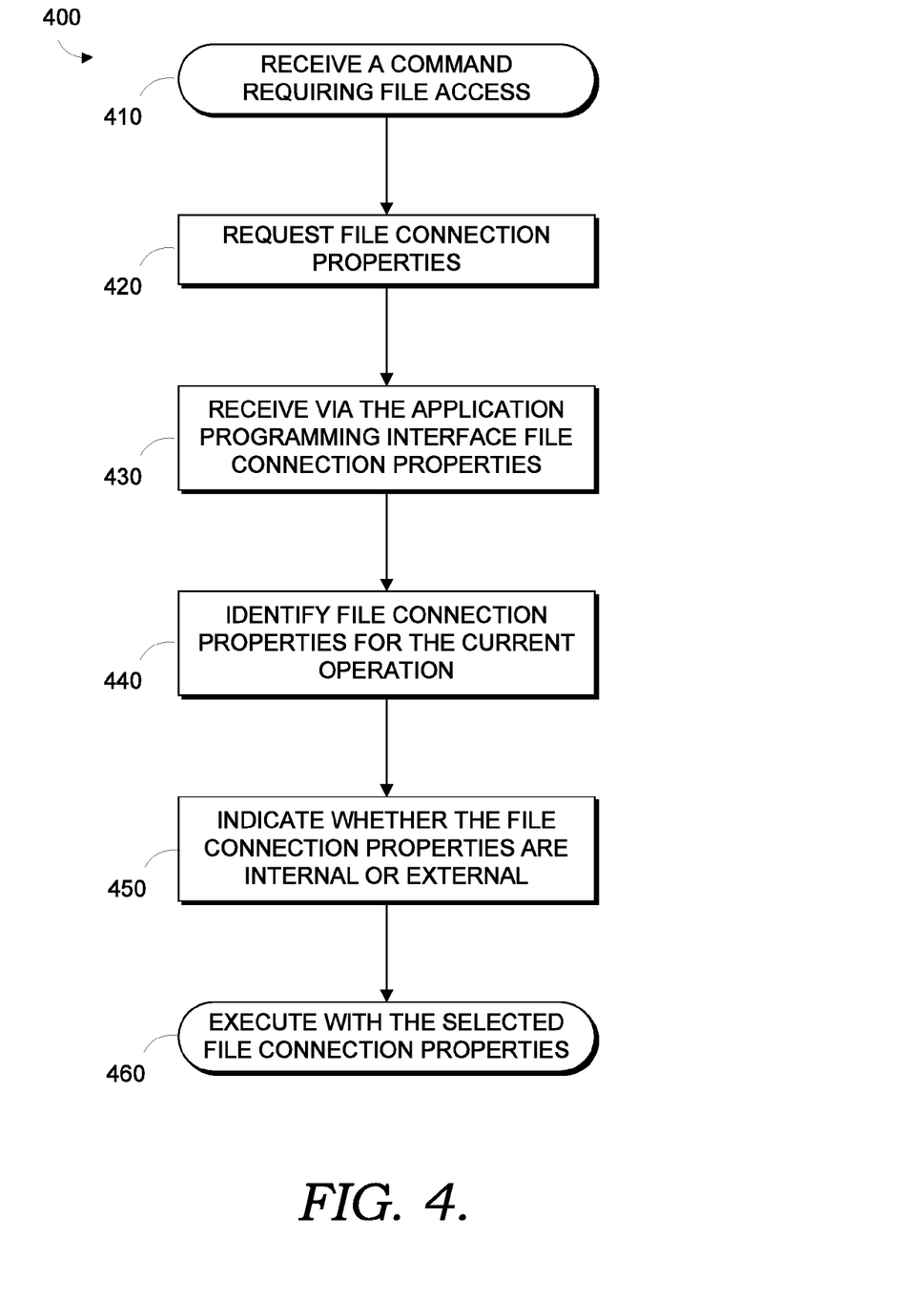
FIG. 4 is a method of interfacing application virtual machines and a mobile device according to embodiments of the invention.

Turning now to FIG. 4, steps for performing a method 400 of interfacing application virtual machines and a mobile device is shown. At a step 410, a command is received that requires file access. Embodiments of the invention perform a step 420, where a request is made by a virtual machine to return file connection properties from memory. This could be a request to retrieve a file, save a file, or otherwise directly or indirectly manipulate the file, such as through a moving, copying, or deleting operation. In accordance with embodiments of the invention, the file connection properties are received via an improved J2ME File Connection API at a step 430. This allows either an internal or external property to be returned. Access also can be determined by such properties as last-used, last-read, or last-written filepaths, or the always available default value.

At a step 440, the file connection properties for the current operation are identified. Again, this can be selected from internal, external, or previous-operation properties stored at the mobile device. These properties are returned to the application VM, such as an application VM 227. Because the API now extends the capability of file access to internal or external locations, at a step 450 an indication as to whether or not the file connection properties are internal or external is given to the virtual machine. For conventions that do not differentiate these structures, "MyPhotos" as an example, this indication allows the user to determine whether or not the file have been read from, written to, or otherwise accessed from a local or external source. A step 460 is performed by the mobile device to execute the operation with the selected file connection properties.

Figure 5:
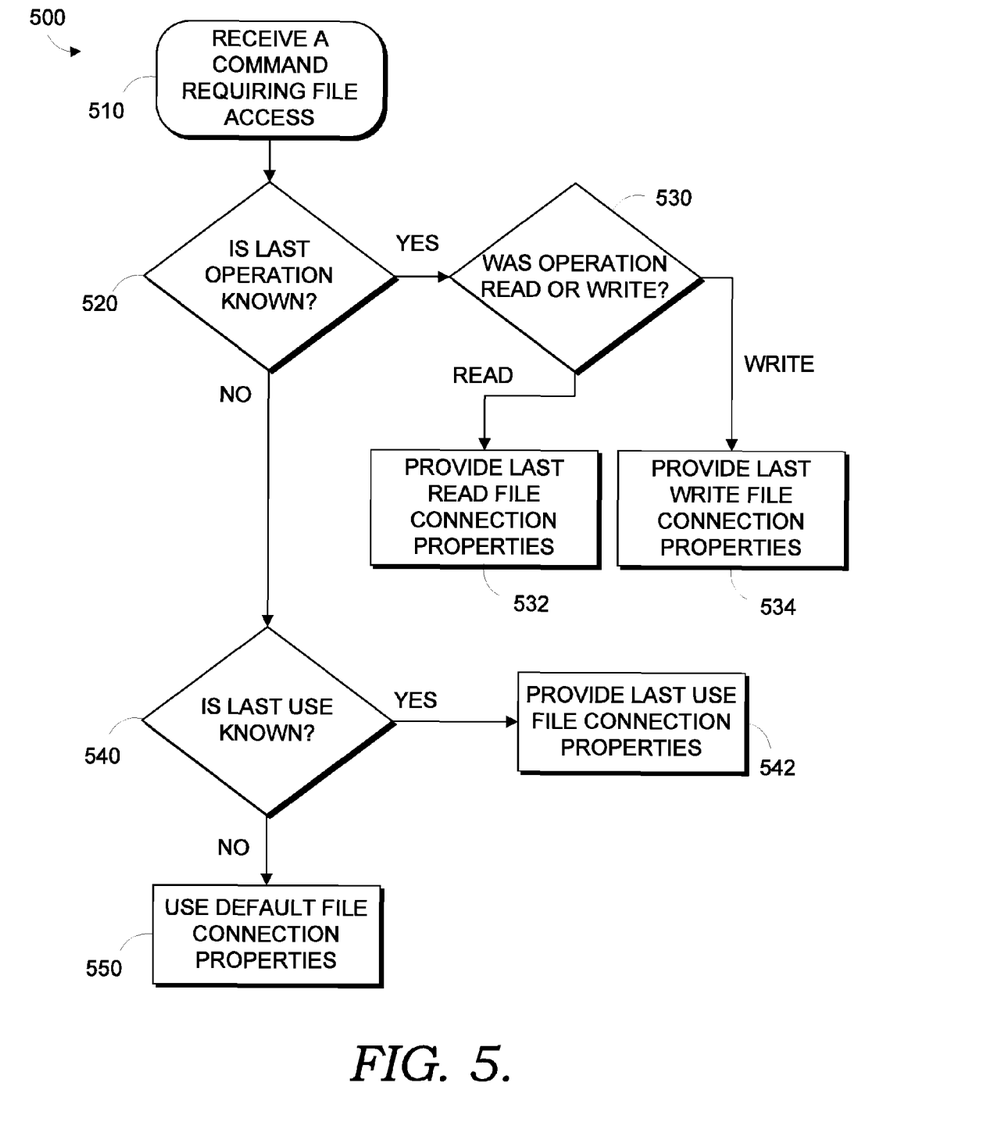
FIG. 5 is a method of providing file connection properties according to embodiments of the invention.
Figure 6:
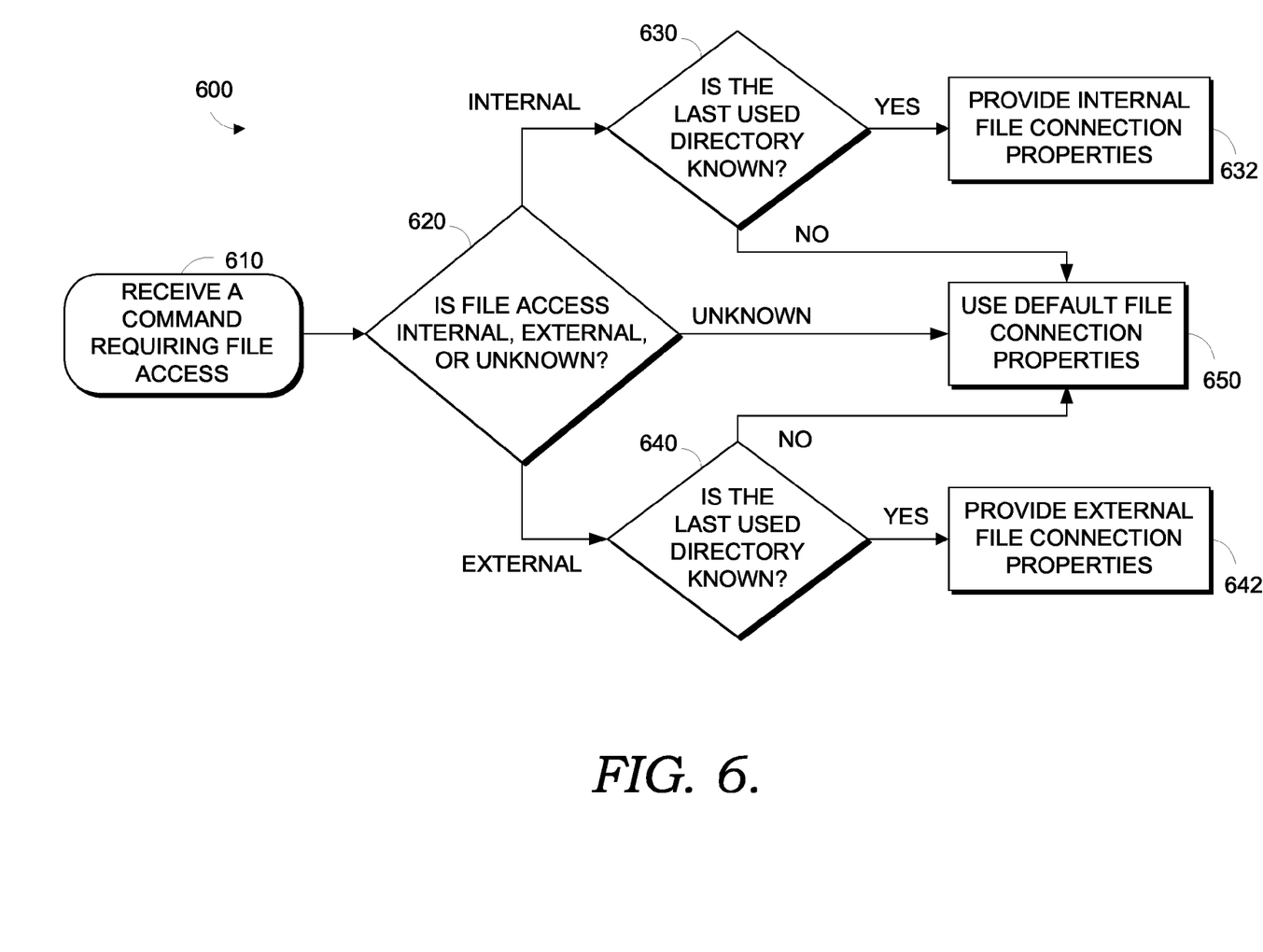
FIG. 6 depicts a method of differentiating filepath access according to embodiments of the invention.

Turning now to FIGS. 5 and 6, steps for performing methods of providing file connection properties are shown according to embodiments of the invention. A command is received at a step 510, wherein the command requires file access. At a step 520, a determination is made as to whether or not the last operation is known. If it is known, a step 530 is performed where a determination is made as to whether the command executed was a read or write operation. A read operation results in providing the last-read file connection properties to a virtual machine, as seen at a step 532. A write operation naturally results in providing last-write file connection properties at a step 534. If the last operation is unknown, whether or not a last-use is known is determined at a step 540. If the last-used directory is known, a step 542 is performed whereby the last-used file connection properties are provided to the VM. If the required information is unknown at step 540, a step 550 is performed, which intuitively provides the default file connection properties.

Looking now at FIG. 6, steps of a method of differentiating filepath access are depicted according to embodiments of the invention. At a step 610, a command that requires file access is received. At a step 620, whether the file access is internal, external or is unknown is determined by the interface. If the file access is directed to an internal storage location, then a step 630 is performed by the interface to determine if the last directory is known. As seen in the figures and descriptions above, this can be the last-used directory, the last written-to directory, or the last read-from directory. If the last directory is known, then the internal file connection properties that apply are provided at a step 632. If this information is not known, the determinative step results in the utilization of the default file connection properties at a step 650. Returning to step 620, if the file access is external, a similar process is undertaken. At a step 640, a last-used directory determination is made that, if known, results in providing external file connection properties to the VM at a step 642. If last-used directory information is not available, the API performs step 650 and provides default file connection property data from the mobile device to the application VM. The final option available at step 620, where the file access is not known to be either internal or external, also results in the API performing step 650 and simply providing the default property information of the mobile device to the VM.

Many different arrangements of the various components depicted, as well as components not shown, are possible without departing from the spirit and scope of the present invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The technology claimed is:

1. A computer system for interfacing application virtual machines in a consistent manner with a mobile device, the system comprising:
   a mobile device, wherein the mobile device includes one or more data structures containing a first and second file connection properties that are useable by the virtual machine,
   wherein the first set of file connection properties includes a plurality of internal location properties on the mobile device that are configured to return values for one or more requested locations of internal storage on the mobile device, and wherein the second set of file connection properties on the mobile device are configured to return values for a plurality of requested locations of external storage in communication with the mobile device; and
   wherein the data structures are configured with at least the following items:
   (1) a storage location last utilized by an application executed on the mobile device,
   (2) a storage location last written to by the application, and
   (3) a storage location last read from by the application.

2. The computer system of claim 1, further comprising:
   an application programming interface (API) to communicate file connection requests between the mobile device and one or more application virtual machines utilizing the file connection properties, wherein the one or more application virtual machines include one or more components utilized to communicate requests and responses regarding the file connection properties to the mobile device.

3. The computer system of claim 2, wherein the requests are indicated as regarding an internal location or external location and solicit values for at least one of the following: a default file location, a last-utilized file location, a last-read file location, and a last-written file location to return.

4. The computer system of claim 3, wherein the file location properties are further sub-divided by one or more media types.

5. The system of claim 4, wherein the one or more media types include at least one of picture files, graphics files, video files, music files, tone files, recording files, message files, and password-accessible private files.

6. The computer system of claim 5, wherein the mobile device further includes an application-level directory identifier synonym that redirects filepath identification to a predefined internal storage location regardless of mobile-device-specific file connection properties.

7. The computer system of claim 6, wherein the external storage location includes at least one of a memory card, a flash drive, and a web-accessible location.

8. A computer-implemented method for interfacing application virtual machines in a consistent manner with a mobile device, the method comprising:
 providing a mobile device, wherein the mobile device includes one or more data structures with at least two sets of file connection properties;
 including in the first set of file storage properties internal location properties on the mobile device that are configured to return values for one or more requested locations of internal storage on the mobile device;
 including in the second set of file storage properties location properties on the mobile device that are configured to return values for one or more requested locations of external storage in communication with the mobile device;
 receiving a request from the virtual machine at the mobile device via an application program interface for a first set and a second set of file connection properties on the mobile device; and
 specifying that the data structure is required to be configured with at least the following items:
  (1) a storage location last utilized by an application executed on the mobile device,
  (2) a storage location last written to by the application, and
  (3) a storage location last read from by the application.

9. The computer-implemented method of claim 8, further comprising:
 communicating, over an application programming interface (API), file connection requests between the mobile device and one or more application virtual machines utilizing the file connection properties, wherein the one or more application virtual machines include one or more components utilized to communicate requests and responses regarding the file connection properties to the mobile device.

10. The computer-implemented method of claim 9, wherein the requests are indicated as regarding an internal location or external location and solicit values for at least one of the following: a default file location, a last-utilized file location, a last-read file location, and a last-written file location to return.

11. The computer-implemented method of claim 10, wherein the file location properties are further sub-divided by one or more media types.

12. The computer-implemented method of claim 11, wherein the one or more media types include at least one of picture files, graphics files, video files, music files, tone files, recording files, message files, and password-accessible private files.

13. The computer-implemented method of claim 12, wherein the mobile device further includes an application-level directory identifier synonym that redirects filepath identification to a predefined internal storage location regardless of mobile-device-specific file connection properties.

14. The computer system of claim 13, wherein the external storage location includes at least one of a memory card, a flash drive, and a web-accessible location.

15. One or more non-transitory computer readable storage media having computer-executable instruction for a computer-implemented method for interfacing application virtual machines in a consistent manner with a mobile device, the method comprising:
 providing a mobile device, wherein the mobile device includes one or more data structures of file connection properties;
 populating the data structures with file connection properties for a first set of file connection properties for a plurality of internal storage locations, wherein the first set is configured to return values for one or more requested locations of internal storage on the mobile device;
 populating the data structures with file connection properties for a second set of file connection properties for a plurality of external storage locations, wherein the second set includes location properties on the mobile device that are configured to return values for one or more requested locations of external storage in communication with the mobile device;
 receiving a request from the application virtual machine for first and second sets of file connection properties, the file connection properties being useable by the virtual machine to determine a location for a file; and
 specifying that the data structure is required to be configured with at least the following items:
  (1) a storage location last utilized by an application executed on the mobile device,
  (2) a storage location last written to by the application, and
  (3) a storage location last read from by the application.

16. The media of claim 15, further comprising:
 communicating, over an application programming interface (API), file connection requests between the mobile device and one or more application virtual machines utilizing the file connection properties, wherein the one or more application virtual machines include one or more components utilized to communicate requests and responses regarding the file connection properties to the mobile device.

17. The media of claim 16, wherein the requests are indicated as regarding an internal location or external location that include at least one of a memory card, a flash drive, and a web-accessible location, and the requests are further configured to solicit values for at least one of the following: a default file location, a last-utilized file location, a last-read file location, and a last-written file location to return.

18. The media of claim 17, wherein the file location properties are further sub-divided by one or more media types.

19. The media of claim 18, wherein the one or more media types include at least one of picture files, graphics files, video files, music files, tone files, recording files, message files, and password-accessible private files.

20. The media of claim 19 wherein the mobile device further includes an application-level directory indentifier synonym that redirects filepath identification to a predefined internal storage location regardless of mobile-device-specific file connection properties.

* * * * *